Patented July 8, 1952

2,602,784

UNITED STATES PATENT OFFICE 2,602,784

SPONGE RUBBER

John F. Taylor, Chicago, Ill., assignor to Ansul Chemical Company, Marinette, Wis., a corporation of Wisconsin No Drawing. Application July 3, 1951, Serial No. 235,107

9 Claims. (Cl. 260—2.5)

This invention relates to the manufacture of a sponge rubber having small uniform cells, with few interconnections between the cells.

In the manufacture of sponge rubber a gas producing material is incorporated in the rubber compounding stock. When this stock is heated in a mold the blowing agent expands the stock to fill the mold. Theoretically, when the stock is fully expanded the cure or vulcanization takes place. Actually, the cure starts while the stock is still expanding. As a result a delicate balance exists between the action of the blowing agent and the vulcanization accelerator. Any variations in the blowing agent can upset this balance and cause premature blow or premature set with a subsequent increase in the amount of rejected material.

By far, the most common blowing agent is untreated sodium bicarbonate. This is obtained in powdered form in one hundred pound paper bags. Screen analysis shows considerable variation in particle size. A typical analysis is as follows:

Per cent through 100 mesh 95–98
Per cent through 200 mesh 60–80
Per cent through 325 mesh 25–45

When sodium bicarbonate is stored it shows a pronounced tendency to cake particularly at variable humidity. This caking is highly undesirable for several reasons. The main objection is that the material is difficult to disperse in the rubber stock, requiring more time on the mixer and showing poor dispersion even after extended mixing. The small crystals of sodium bicarbonate become cemented together forming the equivalent of large crystals. These agglomerates do not always break up on mixing and large uneven cells are formed in the sponge. If the storage at high humidity extends for a period of several months the sodium bicarbonate decomposes, resulting in a product of substandard potency. All these factors introduce variables in a manufacturing process that is delicately balanced.

Hitherto sponge rubber has been produced using untreated sodium bicarbonate. This sponge differs from that produced using treated sodium bicarbonate in several important respects. The cell structure is larger and less uniform. This results in a weaker sponge. More of the cells are connecting which increases water retention by the sponge, which in most cases is an undesirable property. This property of taking up water coupled with a higher content of sodium bicarbonate results in a greater leaching effect. This leaching is evident in automobile door linings as an unsightly white deposit. Because of agglomeration and caking that occurs in untreated sodium bicarbonate the sponge produced is less uniform resulting in a higher percentage of rejects due to underfilling of the mold.

It is an object of this invention to eliminate some of these variables in the sodium bicarbonate. It has been discovered that by premixing a metallic compound with the sodium bicarbonate an improved blowing agent is obtained. The mixing process breaks up all agglomerates and coats each individual crystal with a thin layer of metallic compound. This produces a free-flowing powder of uniform particle size distribution and having an exceptional resistance to caking. The use of such treated sodium bicarbonate in rubber manufacture results in reduction of mixing time, a decrease in the amount of blowing agent required and a decrease in rejects. In addition the resulting sponge has smaller cells, more uniform cell size distribution and less interconnecting cells.

The following is a typical compounding mixture for sponge rubber when using my improved treated sodium bicarbonate:

| | Parts by weight |
|---|---|
| Rubber (masticated) | 100 |
| Xylyl mercaptan (plasticizer) | 1.75 |
| Zinc oxide | 5 |
| Stearic acid | 10 |
| Whiting | 75 |
| Phenyl-beta-naphthyl-amine (antioxidant) | 1.5 |
| Process oil | 15 |
| Petrolatum | 10 |
| Sulfur | 3 |
| Benzothiazyl disulfide (accelerator) | 0.875 |
| Treated sodium bicarbonate | 8.0 |

The ingredients for the sponge rubber stock are thoroughly mixed in a water cooled, enclosed mixer (Banbury mixer). The mix is then extruded into whatever shape is desired, placed in a mold and cured at the temperature of 70 lbs. steam pressure. The product expands to fill the cavities of the mold and then the cure or set starts and is complete in about 25 minutes.

When using untreated sodium bicarbonate in this formula about 15 parts by weight is required, the mixing time is more than doubled and the cell structure of the resulting sponge is much less uniform.

The treated sodium bicarbonate prepared according to this invention must have a particle size such that at least 70 per cent will pass through a 325 mesh screen. The preferred particle size is such that between 80 and 98 per cent will pass through a 325 mesh screen but this invention is not necessarily limited to these ranges.

A number of metallic compounds may be used to render the sodium bicarbonate free-flowing and non-caking. Included in this group as illustrative examples are magnesium stearate, barium stearate, calcium stearate, zinc stearate, aluminum tristearate, lead stearate, zinc palmitate and zinc sebacate. The preferred metallic compounds for my invention are magnesium stearate and calcium stearate, preferably a light grade, 100 per cent passing through a 325 mesh screen. As little as 0.1 per cent and as much as 5 per cent by weight of these metallic compounds may be used, but the preferred range is from 0.5 to 1.0 per cent by weight. The mixing of the sodium bicarbonate and the metallic compound can be performed by any suitable powder mixer so that all of the particles of sodium bicarbonate are completely coated with the metallic compound.

Sponge rubber products made in accordance with my invention have greater resiliency than products made with untreated sodium bicarbonate, they have better expansion properties and a continuous surface skin. The cell structure is small and uniform in size with few interconnections between the cells. The cells are also uniformly distributed. The sponge rubber also resists leaching out of salts when exposed to water or moisture.

The term "rubber" in the appended claims is intended to include natural rubber, synthetic rubber and other vulcanizable synthetic elastomers.

I claim:

1. A process of making sponge rubber which comprises incorporating in a vulcanizable rubber composition sodium bicarbonate particles completely coated with a metallic compound selected from the group consisting of magnesium stearate, barium stearate, calcium stearate, zinc stearate, aluminum tristearate, lead stearate, zinc palmitate and zinc sebacate, said coated sodium bicarbonate particles being prepared by premixing the sodium bicarbonate particles and the metallic compound prior to incorporation with the rubber.

2. The process as defined in claim 1 wherein between 80 and 98% of the particles of coated sodium bicarbonate will pass through a 325 mesh screen.

3. The process as defined in claim 1 wherein the metallic compound constitutes 0.1% to 5% by weight of the sodium bicarbonate.

4. The process as defined in claim 1 wherein the metallic compound constitutes 0.5% to 1.0% by weight of the sodium bicarbonate.

5. A sponge rubber compounding composition comprising rubber, a vulcanization agent, a vulcanizing accelerator, and particles of sodium bicarbonate completely coated with a metallic compound selected from the group consisting of magnesium stearate, barium stearate, calcium stearate, zinc stearate, aluminum tristearate, lead stearate, zinc palmitate and zinc sebacate, said coated sodium bicarbonate particles being prepared by premixing the sodium bicarbonate particles and the metallic compound prior to incorporation with the rubber.

6. A sponge rubber compounding composition comprising rubber, a vulcanization agent, a vulcanizing accelerator, and particles of sodium bicarbonate completely coated with a metallic compound selected from the group consisting of magnesium stearate, barium stearate, calcium stearate, zinc stearate, aluminum tristearate, lead stearate, zinc palmitate and zinc sebacate, 80% to 98% of the coated sodium bicarbonate passing through a 325 mesh screen, said coated sodium bicarbonate particles being prepared by premixing the sodium bicarbonate particles and the metallic compound prior to incorporation with the rubber.

7. A sponge rubber compounding composition comprising rubber, a vulcanization agent, a vulcanizing accelerator, and particles of sodium bicarbonate completely coated with a metallic compound selected from the group consisting of magnesium stearate, barium stearate, calcium stearate, zinc stearate, aluminum tristearate, lead stearate, zinc palmitate and zinc sebacate, said metallic compound constituting 0.1% to 5% by weight of the sodium bicarbonate, said coated sodium bicarbonate particles being prepared by premixing the sodium bicarbonate particles and the metallic compound prior to incorporation with the rubber.

8. A sponge rubber compounding composition comprising rubber, a vulcanization agent, a vulcanizing accelerator and particles of sodium bicarbonate completely coated with a metallic compound selected from the group consisting of magnesium stearate, barium stearate, calcium stearate, zinc stearate, aluminum tristearate, lead stearate, zinc palmitate and zinc sebacate, said metallic compound constituting 0.5% to 1.0% by weight of the sodium bicarbonate, said coated sodium bicarbonate particles being prepared by premixing the sodium bicarbonate particles and the metallic compound prior to incorporation with the rubber.

9. A sponge rubber compounding composition comprising rubber, a vulcanization agent, a vulcanizing accelerator, and particles of sodium bicarbonate completely coated with a metallic compound selected from the group consisting of magnesium stearate, barium stearate, calcium stearate, zinc stearate, aluminum tristearate, lead stearate, zinc palmitate and zinc sebacate, said metallic compound initially passing through a 325 mesh screen and being premixed with the sodium bicarbonate particles prior to incorporation with the rubber, and at least 70% of the coated sodium bicarbonate particles passing through a 325 mesh screen.

JOHN F. TAYLOR.

REFERENCES CITED

The following references are of record in the file of this patent:

UNITED STATES PATENTS

| Number | Name | Date |
| --- | --- | --- |
| 2,461,761 | Nye | Feb. 15, 1949 |
| 2,466,826 | Romaine | Apr. 12, 1949 |
| 2,503,003 | Simpson et al. | Apr. 4, 1950 |
| 2,544,483 | Baum | Mar. 6, 1951 |
| 2,570,182 | Daly | Oct. 9, 1951 |

OTHER REFERENCES

Glasstone, "Physical Chemistry," page 1252, N. Y., 1942.